United States Patent
Mol et al.

(10) Patent No.: US 12,391,485 B2
(45) Date of Patent: Aug. 19, 2025

(54) ANTIMICROBIAL CHECKSTAND CONVEYOR BELT AND METHOD OF MAKING AND MAINTAINING SAME AND ENGAGING SHOPPERS USING THE CHECKSTAND CONVEYOR BELT AS AN ADVERTISING PLATFORM

(71) Applicants: Edward Timothy Mol, Grand Rapids, MI (US); David E. Hathaway, Grand Rapids, MI (US)

(72) Inventors: Edward Timothy Mol, Grand Rapids, MI (US); David E. Hathaway, Grand Rapids, MI (US)

(73) Assignee: Mol Betting Systems, Inc., Grand Rapids, MI (US)

( * ) Notice: Subject to any disclaimer, the term of this patent is extended or adjusted under 35 U.S.C. 154(b) by 37 days.

(21) Appl. No.: 18/070,445

(22) Filed: Nov. 28, 2022

(65) Prior Publication Data
US 2023/0166916 A1    Jun. 1, 2023

Related U.S. Application Data

(60) Provisional application No. 63/283,418, filed on Nov. 26, 2021.

(51) Int. Cl.
*B65G 15/34*    (2006.01)
*A01N 55/00*    (2006.01)
(Continued)

(52) U.S. Cl.
CPC ............. *B65G 15/34* (2013.01); *A01N 55/00* (2013.01); *B05D 3/067* (2013.01);
(Continued)

(58) Field of Classification Search
CPC ........ B65G 15/34; B65G 45/22; A01N 55/00; A01N 25/10; B05D 3/067; B41M 7/0081; G06Q 30/0268; A01P 1/00
See application file for complete search history.

(56) References Cited

U.S. PATENT DOCUMENTS 4,979,591 A * 12/1990 Habegger .............. B65G 15/00
                                                                        101/35
5,358,094 A * 10/1994 Molinaro ................ G09F 19/22
                                                                         40/524
(Continued)

*Primary Examiner* — Mark A Deuble
(74) *Attorney, Agent, or Firm* — Rohm & Monsanto, PLC

(57) ABSTRACT

A multi-layered polymeric checkstand conveyor belt of the type used in grocery stores that is printed to display advertising information to engage the shopper at the point of sale and coated with a durable and impervious antimicrobial-containing surface coating. The inclusion of a QR code on the printed belt enables a shopper to easily access the information with a QR code reader app on the shopper's cell phone which directs to the store's website. The advertising and information content on the website can be easily changed and updated by the store so that the information content, including store promotions and special events are kept current. The antimicrobial agent in the surface coating is a quaternary ammonium organosilane compound that kills microbes on contact and has long-lasting residual effects to destroy and prevent the proliferation of microbes such as bacteria, viruses, mold, and the like. However, the cleanliness of the antimicrobial checkstand conveyor belt must be maintained by regular, and preferably at least daily, cleaning with an all-purpose cleaner and application of an antimicrobial surface protectant that inhibits the growth of bacteria the conveyor belt surface for an extended period of time. Compliance with the cleaning procedure is facilitated and ensured by the provision of an App downloaded to a tablet PC, for example, that has a detailed dashboard and accessible data to remind, report, and confirm cleaning of the belt.

9 Claims, 1 Drawing Sheet

(51) Int. Cl.
  *B05D 3/06* (2006.01)
  *B41M 7/00* (2006.01)
  *B65G 45/22* (2006.01)
  *G06Q 30/0251* (2023.01)

(52) U.S. Cl.
  CPC ........... *B41M 7/0081* (2013.01); *B65G 45/22* (2013.01); *G06Q 30/0268* (2013.01)

(56) References Cited

U.S. PATENT DOCUMENTS

| | | | |
|---|---|---|---|
| 9,296,563 B2 * | 3/2016 | Vanderploeg | B65G 15/30 |
| 2003/0192768 A1 * | 10/2003 | Molinaro | B65G 15/30 |
| | | | 198/844.2 |
| 2004/0065529 A1 * | 4/2004 | Cediel | B65G 15/32 |
| | | | 198/847 |
| 2015/0351445 A1 * | 12/2015 | Arnold | C23C 30/00 |
| | | | 426/323 |

* cited by examiner

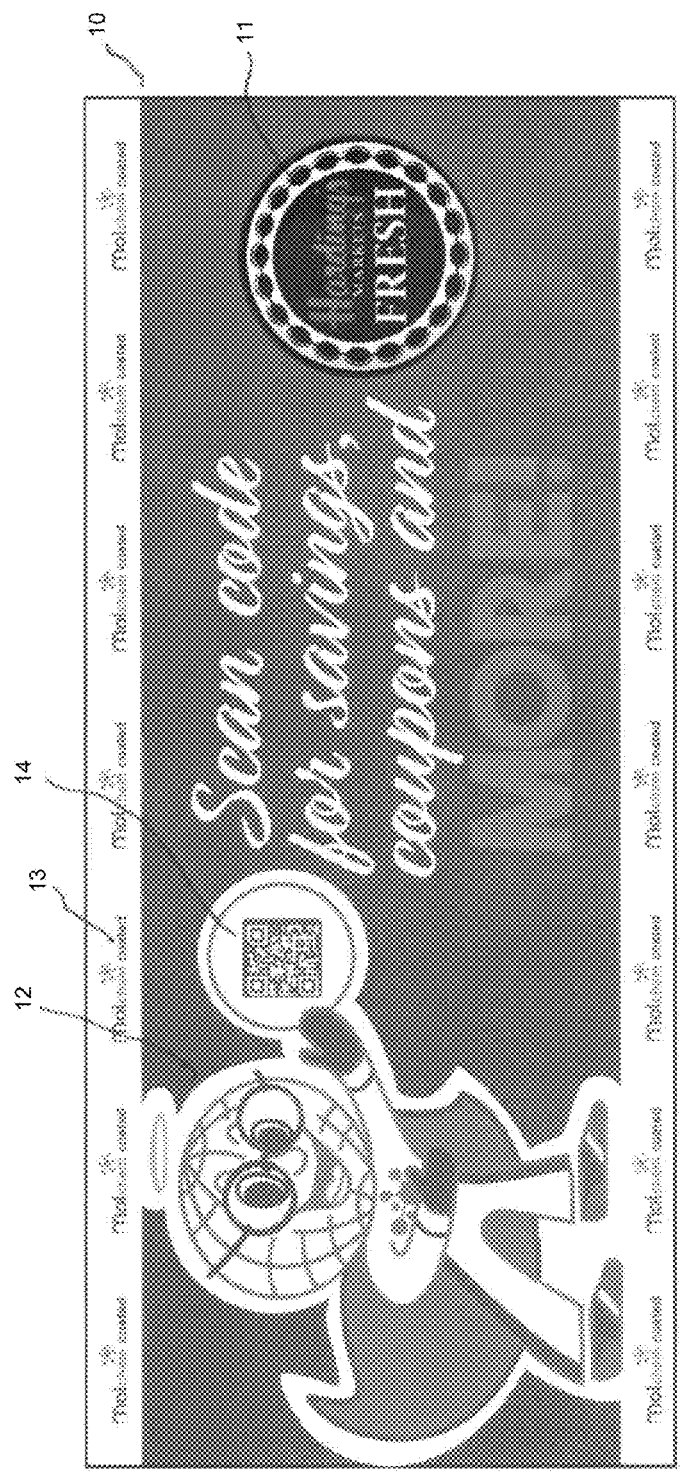

ANTIMICROBIAL CHECKSTAND CONVEYOR BELT AND METHOD OF MAKING AND MAINTAINING SAME AND ENGAGING SHOPPERS USING THE CHECKSTAND CONVEYOR BELT AS AN ADVERTISING PLATFORM

RELATIONSHIP TO OTHER APPLICATION(S)

This application claims the benefit of the filing date of U.S. Provisional Patent Application U.S. Ser. No. 63/283,418 filed on Nov. 26, 2021, the disclosure(s) of which are incorporated herein by reference.

BACKGROUND OF THE INVENTION

Field of the Invention

This invention relates generally to conveyor belts of the type used as a checkstand conveyor belt in grocery and retail stores, and more particularly, to a checkstand conveyor belt having an antimicrobial surface that also displays information to engage the shopper and perform as an advertising platform at the point of sale.

Description of the Related Art

Checkstand conveyor belt arrangements have consumer articles placed thereon, such as meat packages and liquids, that can leak onto the conveyor belt, providing nutrition to colonies of bacteria and other microbes. Shoppers are fully aware of such spills on the conveyor, and are often adverse to permitting the foodstuffs that they intend to purchase from communicating directly with the conveyor. Such shoppers would be comforted by an effective antimicrobial feature in the checkout conveyor.

Presently, the occurrence of widespread communicable diseases, such as the COVID-19 virus, has increased the importance of sanitizing any surface in public spaces that people may come into contact with, and in particular, in public spaces where food is handled, along with other consumer goods. Thus, the cleanliness of a checkstand conveyor belt in a grocery store, where food items are transported from the store to the shopper's home, is of particular concern to the ordinary consumer.

Of course, the checkstand belt can be cleaned regularly with cleansing agents and disinfectants. Many stores already have instituted a cleaning protocol of this type. However, most of the cleaning and sanitizing products that would be used for this purpose have a limited period of efficacy. Therefore, the store's employees are responsible for maintaining the cleanliness of the surfaces by frequent re-application of the products. As a result, the cleanliness of the belt and surrounding surfaces is dependent on the reliability of the employees and the amount of diligence and effort they put into cleaning the surfaces.

There is, thus, a need for providing a checkstand conveyor belt that has an antimicrobial surface that remains effective for an extended period of time, and preferably for the life of the checkstand conveyor belt, and which does not rely solely on the efforts of the employees.

Of course, even if the conveyor belt retains its antimicrobial properties for an extended period of time, the belt would still require cleaning on a regular, or periodic basis, to keep the surface free of spills and accrued dirt. There is, therefore, a need for cleaning products that cleanse and sanitize the belt surface. Preferably, such cleaning products would have long-lasting efficacy, would not be detrimental to the antimicrobial surface of the belt, and would be non-allergenic to the employee applying the product and any shoppers that might come into contact with the treated surfaces.

There are known products for cleaning and sanitizing the conveyor belts, including ethyl alcohol-based products, such as Purell® sanitizers and cleaners available from Gojo Industries, Inc., Akron, OH, that can be applied to the surface periodically or at scheduled time intervals. There are also products on the market which are known to have longer-lasting effects. One such known product is Biotrexx® antimicrobial cleaning solution available from Clearsteam Technologies, Inc., Charlotte, NC, which is used to treat and inhibit the growth of mold, mildew, bacteria and fungus on various surfaces.

Even with the use of products, such as the Biotrexx brand, which have a longer-lasting effect, there is still a need for a method of maintaining the cleanliness of the belt that ensures that the employees responsible for maintaining the cleanliness and antimicrobial properties of the belt do so in a reliable and timely manner. It is unsafe and unwise to mislead shoppers into a false sense of security by failing to properly maintain the belt. On the other hand, if appropriate cleaning and disinfecting is being done by the grocer, it may be wise to advise the shoppers that an effort is being made to secure their health and safety. This would build goodwill for the grocery store. The checkstand belt would be an ideal location to convey this message to the shopper and to advertise and market the grocer's brand, as well as the brands of others, and to provide information on promotions and the like.

The desire for incorporating advertising and other messages or indicia onto conveyor systems has long been recognized. The prior art has numerous times tried to address the need to enhance conveyor belts, particularly at retail checkstands, with decorative and advertising elements that increase visual appeal or stimulate sales of products and services.

Many of the prior art efforts directed toward achieving a suitable display of information at retail checkout locations involve the application of indicia on the checkout conveyor belt. In some such instances, printing is applied directly on the checkout conveyor belt, and in other prior art approaches preprinted material is adhered or otherwise attached to the checkout conveyor belt.

In one known arrangement, described in US publication 2006/0156598, a cover is arranged to surround the entire checkout conveyor belt. In yet another known arrangement described in U.S. Pat. No. 8,985,312, a removable cover is provided for the underlying checkstand belt so that the advertising or announcements on the cover can be easily and inexpensively replaced. U.S. Pat. No. 8,985,312 also discloses embodiments that have an antimicrobial material disposed on the belt cover which comprises silver nanoparticles embedded in a polyurethane film.

It would be advantageous, however, to provide a durable conveyor belt that does not need to be replaced or recovered, and that has an antimicrobial surface that remains effective for an extended period of time, and preferably for the life of the checkstand conveyor belt. It would be particularly desirable if the advertising and informational content printed on the conveyor belt could be easily and rapidly changed without requiring replacement of the belt and/or a cover or removal of adhered stickers.

SUMMARY OF THE INVENTION

The foregoing and other objects, features, and advantages, are achieved by this invention which provides, in one apparatus embodiment, a durable checkstand conveyor belt that is colored and/or printed to convey the customer's branding and messaging and that has extended antimicrobial protection. As used herein, the store, which may be a grocery store or other retail outlet, is referred to as the customer. Customers of the store are herein referred to as shoppers or consumers.

In a particularly advantageous embodiment, the graphics printed on the antimicrobial checkstand conveyor belt are provided by the customer and, in most preferred embodiments, include a QR code. The QR code enables shoppers to use an App, specifically a QR code reader on an internet-enabled device, such as the shopper's cell phone, to direct to a website containing additional information and advertising subject matter. In preferred embodiments, the shopper's mobile device is linked to a website administered and maintained by the customer, or its agents to provide customer-specific information, such as current information on the customer's promotions and specials. This may also include the ability to download and display coupons. Since the App links to the customer's website, changes in the promoted specials and information being provided can be accomplished without requiring the belt to be changed or otherwise modified.

The checkstand conveyor belt is a multilayered polymer belt, or carcass, of the type known in the industry. Typical polymers comprising the carcass include polyvinyl chloride (PVC), polyurethane (PU), or rubber which may, in some embodiments, be reinformed with a fabric.

In a preferred embodiment, a high-volume inkjet printer is used to print high-resolution, high-impact graphics and colors on the top shopper-facing surface of the conveyor belt carcass. As will be evident from the description provided herein, the printed conveyor belt preferably becomes an advertising platform for the store.

The printed belt carcass is then laminated with a liquid coating composition that, when cured, has an antimicrobial agent permanently embedded in the resulting film. This film forms a coating over the printing on the carcass, that is durable and scratch-resistant and provides residual and measurable antimicrobial protection, preferably, for the lifetime of the belt. As used herein, the term antimicrobial protection refers to the inhibition of growth and proliferation of microbes, such as bacteria, viruses, mold.

The liquid coating composition comprises a surface hardener, a liquid UV curable polymer, such as a polyurethane or a methacrylate lacquer, and the antimicrobial agent. In a preferred embodiment, the surface hardener and antimicrobial agent are dispersed in the liquid UV curable polymer to form a liquid coating composition. In a particularly preferred embodiment, the antimicrobial agent is Ztrex Antimicrobial 72 MUP, available from Piedmont Chemical Industries, Inc., Highpoint, NC. Ztrex Antimicrobial 72 MUP comprises the active ingredient 3-(trimethoxysilyl)propyldimethyloctadecyl ammonium chloride (72%) in combination with inert ingredients (28%) and is an effective microbiostatic agent against mold, mildew and algae. This product is not only EPA Registered and FDA Approved, but is used as a best practice for cleanliness in the food and medical industries.

In this embodiment, the antimicrobial-containing liquid coating composition is applied to the top surface of a printed conveyor belt carcass with liquid coating equipment and cured to provide the antimicrobial-coated checkstand conveyor belt of the present invention. The resulting coating is durable and provides a sufficiently impervious surface, for the otherwise somewhat flexible conveyor belt, so that it is easy to clean and maintain, and does not harbor microbes.

The antimicrobial properties and cleanliness of the surface of the conveyor belt must still be maintained by a cleaning regimen in order to extend the effectiveness of the antimicrobial coating overtime. An independent testing lab has verified that the antimicrobial properties of a conveyor belt coated in accordance with the present invention extends for the lifetime of the belt, which is typically five years, provided that the customer's employees adhere to a recommended cleaning protocol which we term herein as the "cleaning step system."

Preferably, this cleaning regimen should be done daily, or on a more frequent schedule, if warranted. As used herein, the term "cleaning" and/or "maintenance" typically refers to both application of a multipurpose cleaning solution to the belt and the application of a protectant as will be described more completely hereinbelow.

In order to confirm and track cleaning from checkstand to checkstand and store to store, an App has been developed that and is provided to the customer, in conjunction with the antimicrobial checkstand conveyor belt, for use by the customer's employee(s) charged with complying with the cleaning step system. The App, which is downloadable to a tablet computer or cell phone, has a detailed dashboard and accessible data. The App provides scheduling and reminders for the cleaning regimen, as well as informational documentation and instructional videos on the cleaning technique. Confirmation of cleaning can be entered on the App to provide a report to management of the employee's compliance with the cleaning step system. In a preferred embodiment, the App also provides an automatic reorder with reminder for the preferred cleaning products used in the system.

As part of the cleaning step system, the preferred products for cleaning and maintaining the conveyor belt have been formulated specifically to be compatible with the antimicrobial checkstand conveyor belt of the present invention so that the use of these products does not degrade or negatively impact the conveyor belt material or antimicrobial coating. Moreover, the preferred products are non-toxic to employees and shoppers who might come in contact with the conveyor belt or the products, yet are still potent enough to kill and inhibit the growth of bacteria and viruses. Most importantly, independent lab tests have shown that these products are more effective at maintaining the long-term effectiveness of the antimicrobial coating on the conveyor belt than cleaners presently on the market that were not designed for conveyor belt surfaces.

These products include:
(1) a multipurpose cleaner that can be used on the checkstand belt as well as other surfaces in the grocery store, including, without limitation, metal, plastic, and stainless steel. Shopping carts, shelving, refrigerated and freezer units, for example, all need cleansing and sanitizing and would greatly benefit from the use of this multipurpose cleaner; and
(2) a protectant that inhibits the growth of bacteria on the conveyor belt surface for up to 2-3 weeks.

The multipurpose cleaner may be any industrial cleaner which is non-toxic and does not damage the antimicrobial conveyor belt surface. In a specific illustrative embodiment, the multipurpose cleaner is Formula 409®, available from The Clorox Company, Oakland, CA.

The protectant is an aqueous solution of a quaternary ammonium organosilane compound that not only has the capacity to kill microbes on contact, but also create an active antimicrobial barrier that bonds to the surface of the conveyor belt to provide long-term residual protection. This type of technology is described, for example, in U.S. Pat. Nos. 10,993,441 and 10,980,236 and US Publication No. US 2019/0367843 laid-open on Dec. 5, 2019. In a specific preferred embodiment, the protectant is Biotrexx 247® antimicrobial cleaning solution.

Independent studies have shown efficacy of the protectant against *Listeria, Salmonella, E. Coli* and a wide-range of bacterial and viral contaminants. In fact, in a preferred concentration, the antimicrobial agent has been shown to cause a significant reduction in *Salmonella*. It also prevents mold and mildew growth on treated surfaces.

In addition to the cleaner and protectant, the use of lint-free microfiber cloths and non-scratching cleaning pads are recommended in a preferred embodiment. The preferred lint-free microfiber cloths and cleaning pads clean and dry the antimicrobial-coated conveyor belt without damaging the surface. In a preferred embodiment, the lint-free microfiber cloths and non-scratching cleaning pads are provided to the customer as part of the cleaning step system of the present invention.

In a method embodiment in accordance with the present invention, the cleaning step system comprises the following recommended steps:
1) clean debris between the checkstand conveyor belt and checkstand conveyor strikeplate;
2) apply, which may mean spray, the antimicrobial-coated conveyor belt with the multipurpose cleaner;
3) wipe the sprayed area with a lint-free cloth and/or non-scratching cleaning pad to remove any visible dust, debris, and grime resulting in a cleaned conveyor belt;
4) apply the antimicrobial protectant to the surface of the cleaned conveyor belt; and
5) wipe the surface dry with a clean, and preferably, lint-free cloth, to form a protective coating on the cleaned conveyor belt that has residual long-lasting antimicrobial inhibiting effect.

In a particularly preferred embodiment, all of the foregoing products are sold and promoted as one system. This system includes the printed antimicrobial conveyor belt; the products required for the cleaning step program, including cleaners, protectants, lint-free cloths, and cleaning pads; and a tablet computer loaded with the App for the cleaning step system as described above.

In addition to a checkstand conveyor belt, the antimicrobial technology of the present invention can be applied to other products, such as message mats. Message mats are small, stationary protective mats that can be placed throughout the store in high-touch locations, such as the counters at the pharmacy, deli, and customer services, and in the self-checkout areas. As the name implies, these protective mats can be printed with store promotion and advertising just like the conveyor belt of the present invention.

As an adjunct to the antimicrobial surface coated products and cleaning step system for the checkstand conveyor belt, a floorstand station, as is known in the industry, for dispensing hand sanitizer, can also display advertising media for the store and for the antimicrobial products being used to clean and sanitize the store.

All of the foregoing are provided to the customer as part of an advertising and promotional program which enhances shopper awareness of the brand and the customer's attention to their health and safety in accordance with the present invention.

BRIEF DESCRIPTION OF THE DRAWING

Comprehension of the invention is facilitated by reading the following detailed description, in conjunction with the annexed drawing, in which:

FIG. 1 is a top plan view of an antimicrobial checkstand conveyor belt bearing printed advertising media in accordance with the present invention.

DETAILED DESCRIPTION

FIG. 1 is a top plan view of an antimicrobial conveyor belt bearing printed advertising media in accordance with the present invention. In this embodiment, the conveyor belt 10 is printed with customer branding, such as color choice and customer logo 11. In this particular embodiment, the printing also includes the manufacturer's trademark 13 and logo 12 which helps to promote the customer's sanitation practices. Since the antimicrobial checkstand belt is an integral part of the store's sanitation effort, this is a perfect location to let shoppers know that the store is investing in their health and safety. Inclusion of QR code 14 further engages the shopper to obtain additional information and enhances the shopping experience.

QR code (an acronym for Quick Response code) 14 is a type of matrix or two-dimensional barcode. A barcode is a machine-readable optical label that contains information about the item to which it is attached. Due to their fast readability by an imaging device, such as a camera, the use of QR codes in marketing has proliferated due to the almost ubiquitous use of mobile phones bearing cameras. The fact that more than 60% of consumers are using their mobile phone as their primary communication device supports the potential of the QR code at the checkout area.

When QR code 14 is scanned with an internet-enabled mobile device, such as the shopper's own cell phone, the code directs to a website that is displayed on the shopper's device which provides up-to-the-minute information to the shopper, such as the current store promotions and specials. Of course, touting the sanitization practices implemented by the store for the shopper's health and safety on this website builds goodwill. Since the website is administered and maintained by the store, the information can be kept current without requiring any modification of the antimicrobial conveyor belt.

QR codes have been well-used for various purposes, such as by the manufacturer or distributor of goods to provide additional information on a product and method of using the product. QR codes have also been used by retail outlets in connection with loyalty programs. The QR codes for loyalty programs are typically printed on the receipt for a purchase or on the products themselves. However, QR codes have not been printed on a conveyor belt of the type used in retail establishment checkstands as part of an advertising and promotional program t the point of sale.

The advertising subject matter printed on the antimicrobial checkstand conveyor belt of the present invention may include, inter alia, branding pertinent to the retail store; branding pertinent to products in the retail store; advertisements and promotions offered by the retail store and/or its vendors; information provided by a third party, concerning, for example, local events, such as concerts or sports events and fund-raising events by a charity seeking contributions; and information about the cleaning and sanitization effort being implemented by the store.

The use of the QR code advantageously enables the customer, which may be a grocer, to engage with manufacturers of the consumer goods being sold in the grocery store to create another income stream for the store. Manufacturers of products, or providers of services, can purchase advertising on the conveyor belt media platform and/or on the grocer's website to which the QR code directs.

The QR code as printed on the conveyor belt can also be provided to the shopper on supporting materials displayed at the checkout or on other advertising media in the retail store on advertising campaign items, such as posters, window displays, banners, counter displays, menu displays, cash register overlays, free standing cutouts, dynamic advertisements on electronic displays, and the like. In a particularly advantageous embodiment, the QR code can be provided to the shopper on a printed flyer, for example, that can be handed, or otherwise provided, to the shopper at the checkout to provide yet another opportunity to re-engage the shopper at home.

Although the invention has been described in terms of specific embodiments and applications, persons skilled in the art can, in light of this teaching, generate additional embodiments without exceeding the scope or departing from the spirit of the invention herein described. In particular, while the disclosure herein has been directed to the grocery industry, the technology is applicable to any retail (or other) outlet that uses a checkstand conveyor. General merchandise stores, such as Walmart, or discount stores, such as dollar stores, and the like, all use conveyor belt checkstands and would greatly benefit from the invention of the present application. Even in an industrial situation, it could be advantageous to print information on a conveyor belt, such as identification or the goods being conveyed or instructions to employees. Of course, the use of a QR code would permit an employee to access more detailed or current instructions and information.

Accordingly, it is to be understood that the drawing and description in this disclosure are proffered to facilitate comprehension of the invention, and should not be construed to limit the scope thereof. Moreover, the technical effects and technical problems in the specification are exemplary and are not limiting. The embodiments described in the specification may have other technical effects and can solve other technical problems.

What is claimed is:

1. A multi-layered checkstand conveyor belt comprising:
   a) a polymeric or fabric-reinforced conveyor belt carcass; and
   b) a durable scratch-resistant coating applied to the top surface of the polymeric conveyor belt carcass which contains a surface hardener and a quaternary ammonium organosilane compound that is effective against microbes, including bacteria and viruses, as an antimicrobial agent.

2. The multi-layered checkstand belt of claim 1 further including printing on the top surface of the conveyor belt carcass so that the antimicrobial agent coated polymeric checkstand conveyor belt functions as a media platform to convey information.

3. The multi-layered checkstand conveyor belt of claim 2 wherein the printing includes a QR code that directs to a website containing advertising and other information.

4. The multi-layered checkstand conveyor belt of claim 3 wherein the website is administered and maintained by a customer to provide customer-specific information.

5. The multi-layered checkstand conveyor belt of claim 1 wherein the quaternary ammonium organosilane compound is 3-(trimethoxysilyl) propyldimethyloctadecyl ammonium chloride.

6. A method of making an antimicrobial checkstand conveyor belt having a polymeric conveyor belt carcass comprising the steps of:
   a) printing graphics on the top surface of the conveyor belt carcass;
   b) applying a liquid UV curable polymer coating composition to the top surface of the polymeric conveyor belt carcass, the UV curable polymer coating composition including a surface hardener and an antimicrobial agent which is a quaternary ammonium organosilane compound that is effective against microbes, including bacteria and viruses; and
   c) curing the UV curable polymer coating composition to form a durable scratch-resistant antimicrobial checkstand conveyor belt.

7. A method for cleaning and maintaining an antimicrobial checkstand conveyor belt, the checkstand conveyor belt comprising a polymeric or fabric-reinforced conveyor belt carcass and a durable scratch-resistant coating which contains a surface hardener and an antimicrobial agent applied to the top surface of the polymeric conveyor belt carcass, in a cleaning protocol comprising the following steps:
   a) applying a multipurpose belt cleaner to the top surface of the antimicrobial checkstand conveyor belt;
   b) wiping the antimicrobial checkstand conveyor belt with a lint-free cloth and/or cleaning pad to remove any visible dust, debris, and grime resulting in a cleaned conveyor belt;
   c) applying an antimicrobial protectant to the surface of the cleaned conveyor belt; and
   d) drying the surface of the conveyor belt by wiping with a clean cloth to form a protective coating.

8. The method of claim 7 wherein the antimicrobial protectant comprises an aqueous solution of a quaternary ammonium organosilane compound.

9. The method of claim 7 further comprising the step(s) of repeating said cleaning protocol on a schedule.

* * * * *